United States Patent
Bill et al.

[11] Patent Number: 5,837,909
[45] Date of Patent: Nov. 17, 1998

[54] TELEMETRY BASED SHAFT TORQUE MEASUREMENT SYSTEM FOR HOLLOW SHAFTS

[75] Inventors: Stephen L. Bill, Brookline, N.H.; Wayne A. Pittman, Milpitas, Calif.; David P. Swartz, San Jose, Calif.; Allen A. Sweet, Alameda, Calif.

[73] Assignee: Wireless Data Corporation, Mountain View, Calif.

[21] Appl. No.: 796,120

[22] Filed: Feb. 6, 1997

[51] Int. Cl.⁶ .............................. G01L 3/10; G08C 17/02
[52] U.S. Cl. .................................. 73/862.338; 340/870.01
[58] Field of Search ....................... 73/862.338, 862.321, 73/862.325, 862.28, 862.339

[56] References Cited

U.S. PATENT DOCUMENTS

| | | |
|---|---|---|
| 3,619,612 | 11/1971 | Belke et al. . |
| 3,824,845 | 7/1974 | Huebner . |
| 4,160,970 | 7/1979 | Nicolson .............................. 340/18 LD |
| 4,838,077 | 6/1989 | Shifflet et al. ................. 73/862.338 X |
| 4,839,644 | 6/1989 | Safinya et al. ........................... 340/854 |
| 4,862,752 | 9/1989 | Hoyt ..................................... 73/862.34 |
| 4,907,168 | 3/1990 | Boggs . |
| 4,982,101 | 1/1991 | Baker . |
| 5,016,478 | 5/1991 | Mercat . |
| 5,321,981 | 6/1994 | Macpherson .......................... 73/152.43 |
| 5,370,003 | 12/1994 | Bergeron . |
| 5,438,329 | 8/1995 | Gastouniotis et al. . |
| 5,501,109 | 3/1996 | Naito et al. . |
| 5,555,457 | 9/1996 | Campbell et al. . |
| 5,557,975 | 9/1996 | Crane et al. . |
| 5,705,757 | 12/1997 | Wozniak ................................ 73/862.28 |
| 5,736,938 | 4/1998 | Ruthroff ............................. 340/870.37 |

*Primary Examiner*—Ronald L. Biegel
*Attorney, Agent, or Firm*—James Creighton Wray; Meera P. Narasimhan

[57] ABSTRACT

A hollow shaft torque measurement and telemetry system is provided for race cars. The system provides information on the torque delivered to each drive wheel of a race car while the race car is in motion. That information is valuable in attempting to maximize the speed during a race. The system operates under the high vibrations and temperature levels typical of a race car. A set of strain gauges, a transmitter, and batteries are installed inside one of the hollow shafts connected to a race car's drive wheels. The batteries provide power for the system. The strain gauges are mounted in an electrical bridge configuration so that they provide an electrical indication of torsion only. The strain gauges are connected to the transmitter. The transmitter converts that electrical indication of torsion to an FM radio signal, and has an automatic calibration circuit. The transmitter is connected to a rotating antenna over-wrapped with glass epoxy on the outside of the shaft. The FM radio signal is transmitted via the over-wrapped antenna. A whip antenna mounted on a stationary non-rotating part of the race car receives the FM radio signal from either or both hollow shafts. The whip antenna is connected to a specially hardened low power receiver mounted on a stationary part of the race car. The receiver receives the FM radio signal, demodulates and conveys a torque related voltage to the race car's indicator and data collection system.

26 Claims, 3 Drawing Sheets

TELEMETRY BASED SHAFT TORQUE MEASUREMENT SYSTEM FOR HOLLOW SHAFTS

BACKGROUND OF THE INVENTION

This invention applies to torque measurement on drive wheels of a race car while the race car is in motion. Dynamometers can measure torque in stationary positions. Numerous dynamometers products are available. It may be possible to use slip rings, but that has not worked in race cars to date. No telemetry product is available.

SUMMARY OF THE INVENTION

The invention provides a telemetry system for measuring torque delivered to each drive wheel of a race car while the car is in motion (either racing or in test).

An objective of the invention is to provide a complete system, using low power transmitters with an automatic calibration circuit, special hardened low power receivers and glass epoxy over-wrapped antennae plus standard batteries and strain gauges.

Sets of strain gauges, transmitters and batteries are installed inside the hollow shafts of the race car's drive wheels. The transmitters are wired to an antenna that is over-wrapped on the outside of the shaft. The strain gauges are mounted in an electrical bridge configuration to cancel the effects of bending and to provide an electrical indication of torsion only. The transmitters are connected to the strain gauges and convert the electrical indication to an FM radio frequency which is transmitted via the antenna on the outside of the shafts. Circuitry in the antenna isolates the internal batteries. A whip antenna, mounted on a stationary part of the race car, receives the FM radio signal and conveys it through a connection to a low power receiver which is stationary. The stationary receiver is connected to the race car's data collection system.

The present invention is directed to providing torque on each wheel while in motion. This information is valuable in the program to maximize the power output during the race.

To operate in that environment, the system meets several requirements. There can be no modification of the shaft such as drilling or welding. Accuracy must be maintained over the entire speed range, and in addition calibration must be maintained. The system must operate accurately at up to 3,000 RPM and must continue to function at temperatures up to 125 degrees Celsius. The equipment inside the shaft must withstand the extreme vibration forces. Batteries must have an operating life of, at least, 140 hours.

The system measures full scale shaft torque up to 2,500 lb. ft. The receivers draw less than 100 mA from the vehicles power circuit. The system connects to the vehicle's data collection system. A data bandpass is at least 1 kHz. Total system weighs less than 2 lbs. The system operates during a race or in test. Attempts to measure this torque with telemetry systems on the outside of the shafts have not worked due to the extreme conditions. The invention provides an installation inside the shaft. It is unique in its components, its installation inside the hollow shaft and its ability to operate from very low prime power while the race car is in motion.

Needs exist for new products which can operate while vehicles are in motion and which can withstand severe temperature, vibration and torque conditions, and operate from very low prime power available in race cars. This invention provides the race car engineer/driver with information that offers an edge over other competitors, thereby resulting in all race cars needing a system. Every race car team should be interested. The time differences between first and twentieth finishes is often a matter of milliseconds per lap. This invention could make up the difference.

The present method of sensing and telemetering torque on a hollow shaft includes sensing torque strain inside a hollow shaft. Power is provided from a power supply within the hollow shaft. A torque signal is produced proportional to torque strain sensed within the hollow shaft. A radio frequency signal is produced within the hollow shaft, and is modulated with the torque signal from within the hollow shaft. The modulated signal is conducted to a rotating antenna mounted on the shaft and is broadcast from the rotating antenna. The modulated signal is received on a stationary antenna. The stationary antenna directs the modulated signal to the stationary receiver. The torque strain signal is recovered from the modulated signal in the receiver, which provides an output proportional to the sensed torque strain inside the hollow shaft.

Preferably, strain gauge and transmitter power is provided by batteries which are mounted within the hollow shaft. A four arm strain gauge bridge is mounted inside the hollow shaft. Power is provided from the power supply to opposite positions on the bridge, and torque output is provided from spaced positions on the strain gauge bridge. A shunt is provided between an input and output on the strain gauge bridge.

A lower frequency signal is modulated with the strain gauge bridge output and a higher frequency carrier signal is modulated with the modulated lower frequency signal.

The modulated radio frequency signal is conducted from the transmitter inside the shaft through a cable by leading the cable from the interior of the shaft through a universal joint to the rotating antenna on the outside of the hollow shaft.

The apparatus for hollow shaft torque telemetry includes a power supply for mounting in a hollow shaft. A torque strain gauge is connected to the power supply for mounting within the hollow shaft. A transmitter is mounted within the shaft and connected to the strain gauge and to the power supply for producing a radio frequency signal with strain gauge output modulation. A signal conductor is connected to the transmitter and extends through the end of the hollow shaft to outside of the hollow shaft. A rotating antenna is mounted outside the hollow shaft and is connected to the signal conductor. A stationary antenna is mounted on a vehicle and receives a radio frequency signal from the rotating antenna. A receiver is connected to the stationary antenna which receives the radio frequency signal and separates strain gauge modulation therefrom and output is produced related to shaft torque.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
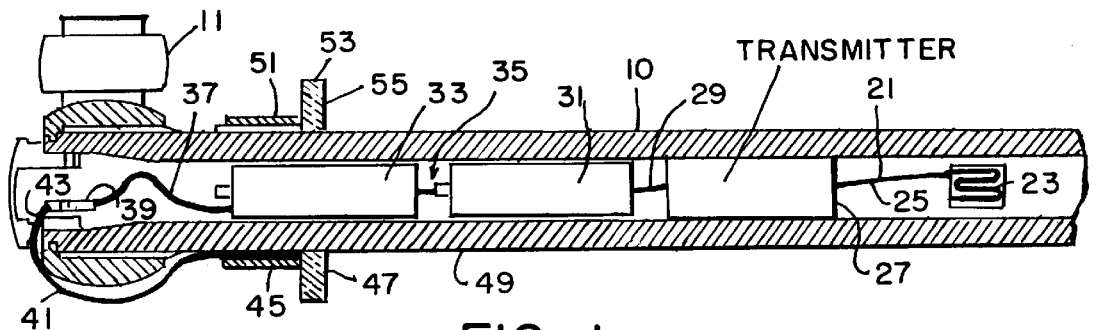
FIG. 1 is a perspective view partially cut away of the shaft with the assembly of the system.

Referring to FIG. 1, a hollow shaft of the type used in motor vehicles and particularly race cars is referred to by the numeral 10. A universal joint 11 at one end of the shaft 10 connects the hollow shaft with a differential. A driving wheel, which is usually a rear wheel, is connected to the other end of the shaft. Measurements of hollow shaft torque is extremely important.

The present invention provides a torque measurement and transmitting system, generally indicated by the numeral 21. The system has a strain gauge 23 connected by wires 25 to a transmitter 27. Wires 29 connect the transmitter to lithium batteries 31 and 33 connected in series to provide a 7.2 volt power supply 35 for transmitter 27. A signal conductor 37 extends from the power supply to a connector 39. A conductor 41 has one end 43 connected to the connector 39. The conductor 41 extends radially through an open space in the universal joint 11, and then generally, axially through a space between lobes of the universal joint 11 and outward along the shaft 10. The second end 45 of the conductor 41 is connected to an antenna 47 which extends radially from an exterior wall 49 of the shaft 10 near the universal joint 11. A collar 51 locks the antenna in place. The antenna may include a wire or wires 53 which are embedded in a reinforced plastic ring 55. The antenna 47 rotates with the shaft as the universal joint 11 rotates to drive the shaft 10 and wheel.

Figure 2:
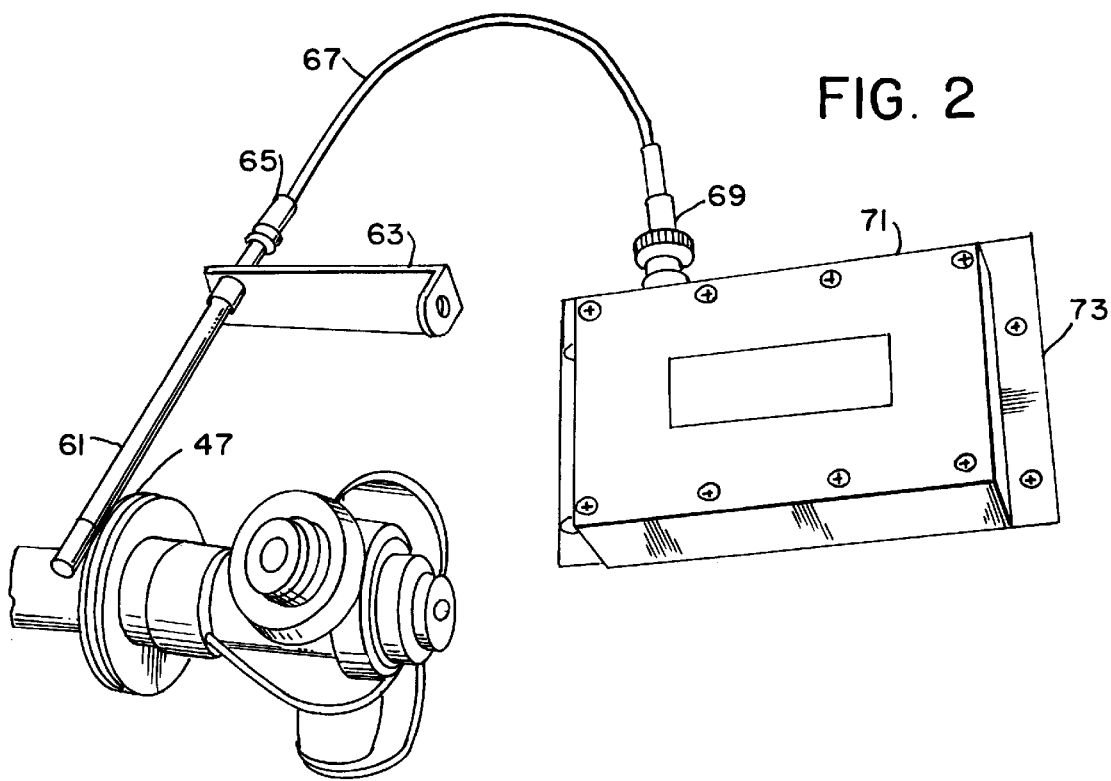
FIG. 2 is a picture of the outside of a completed system.

As shown in FIG. 2, a stationary antenna 61 is mounted on a fixture 63 which is secured to a fixed portion of the vehicle. One end 65 of a coaxial cable 67 is connected to antenna 61. The opposite end 69 of the coaxial cable is connected to a receiver 71, which is mounted with a fixture 73 on a stationary part of the vehicle.

Figure 3:
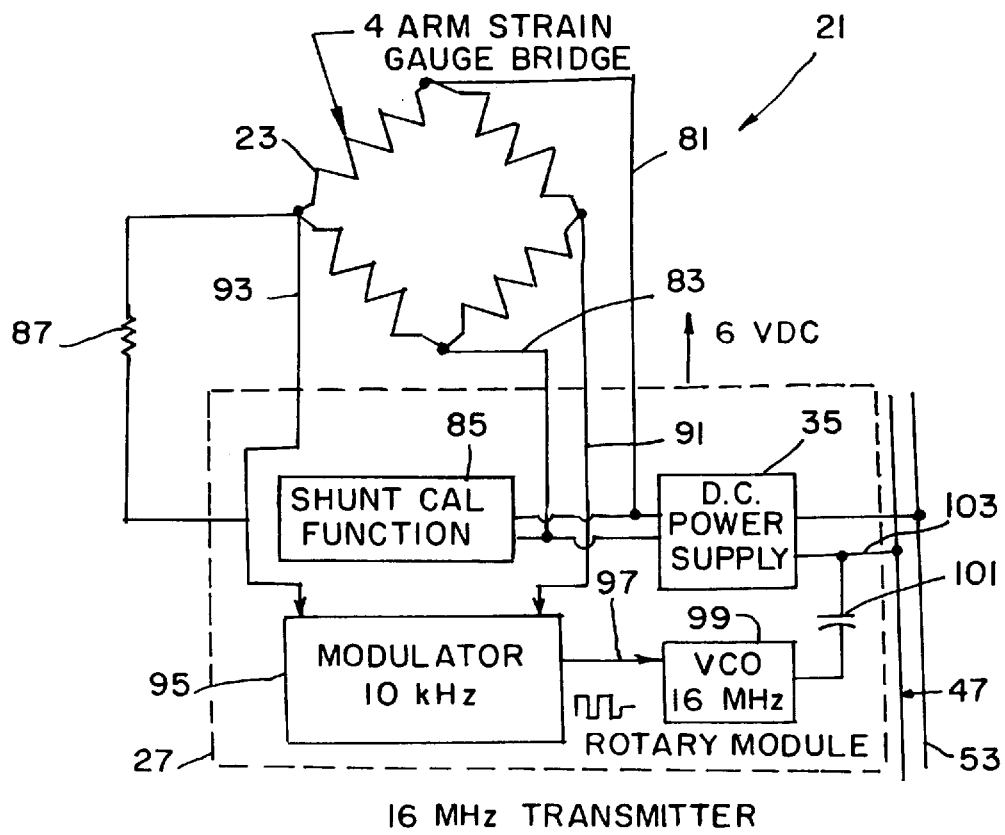
FIG. 3 is a block diagram of the transmitter.

As shown in FIG. 3, the torque measurement and transmitting system 21 has a four arm strain gauge bridge 23 which is bonded to an interior of the shaft. The DC power supply 35 supplies power to the strain gauge bridge 23 through wires 81 and 83. The 16 megahertz transmitter 27 has a shunt calibration function 85 with a fixed resistance 87 which create a shunt between strain gauge bridge input 83 and output 93. Outputs 91 and 93 from the four arm strain bridge 23 are connected to a 10 kilohertz modulator 95. The torque strain outputs 91 and 93 to a 5 kilohertz pulsed signal source to modulate the frequency of pulses provided on a modulator output line 97. A 16 megahertz VCO 99 is connected by a capacitor 101 to a power output 103 from the DC power supply. Pulse width modulation by the signal from line 97 is imposed on the 16 megahertz radio frequency signal provided to wires 53 of antenna 47.

Figure 4:
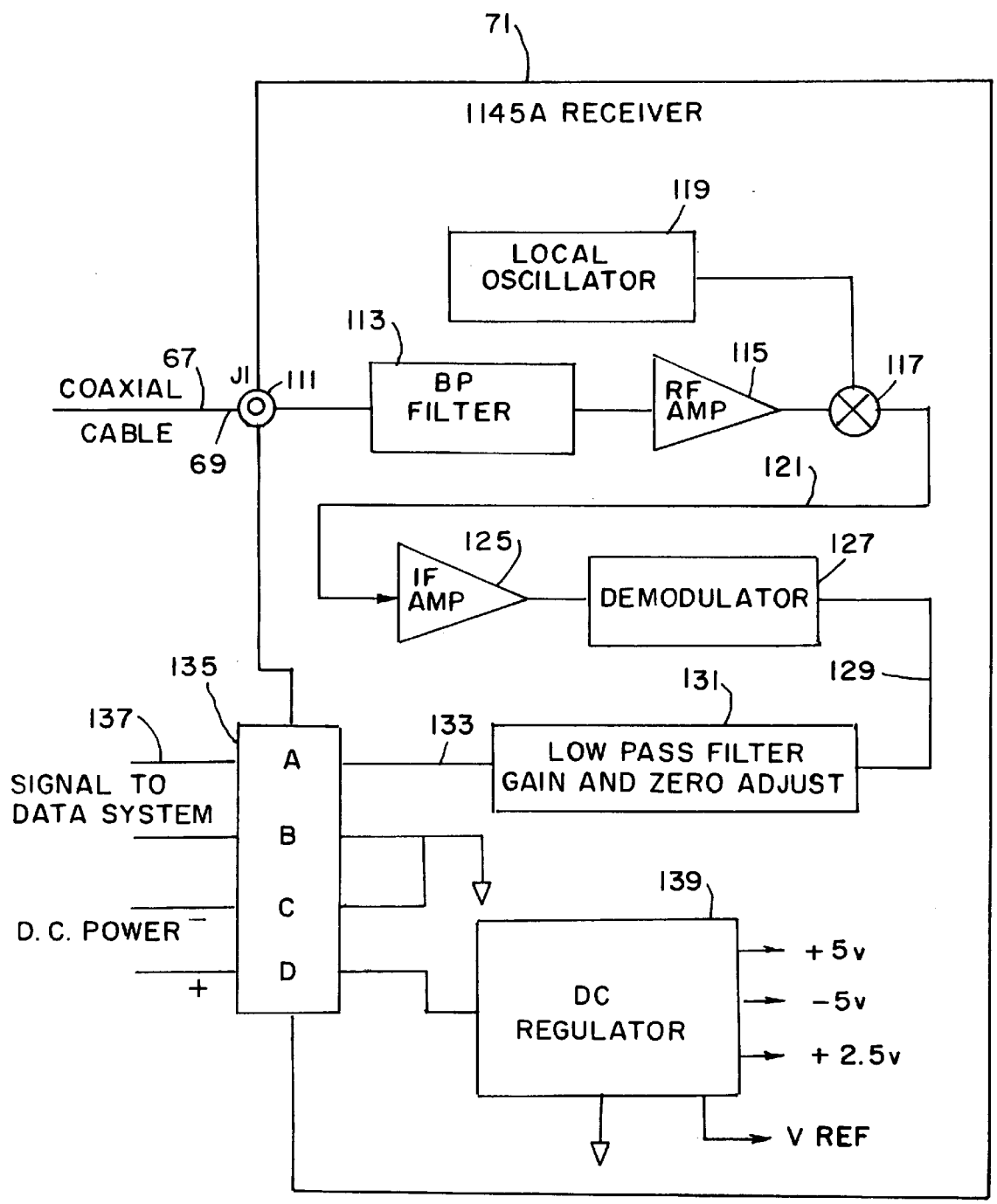
FIG. 4 is a block diagram of the receiver.

As shown in FIG. 4, coaxial cable 67 conducts the received modulated RF signal to the receiver 71. End 69 of the coaxial cable is connected to the connector jack 111 which leads the signal to a band pass filter 113. A radio frequency amplifier 115 amplifies the filtered signal and provides the signal to a mixer 117 which also is fed a signal from a local oscillator 119. The radio frequency signal is removed by the mixer. The resultant intermediate frequency signal on line 121 is amplified by an IF amplifier 125 and fed to a demodulator 127. The demodulated signal on line 129 is provided to a low pass filter 131 which provides gain and zero adjust to provide an output voltage on line 133 which is proportional to the torque in the hollow shaft.

Terminals A and B on the power connector 135 provide an output on lines 137 which is the voltage on 133. The connector 135 has power ports C and D which are respectively connected to a vehicle power supply. Vehicle-supplied positive voltage is applied to a DC regulator 139 to provide +5 –5 +2.5 volts and a reference voltage.

The four arm strain gauge 23 shown in FIG. 3, ensures that voltage between output lines 91 and 93 are related only to torque. Thus, only torque voltages are used to modulate the RF signal provided on the rotating antenna, and only torque related levels are produced in the demodulated voltage in line 129 and on the output 137 of the receiver.

The torque measurement signal on line 137 is reproduced on a meter on the instrument panel to provide instantaneous torque indications to the driver. Torque signals may be relayed to remote crews and may be accumulated to suggest track condition-related equipment requirements and vehicle performance.

While the invention has been described with reference to specific embodiments, modifications and variations of the invention may be constructed without departing from the scope of the invention, which is defined in the following claims.

We claim:

1. A method of sensing and telemetering torque on a hollow shaft comprising sensing torque strain inside a hollow shaft, providing power from a power supply within the hollow shaft, producing a torque signal proportional to sensed torque strain within the hollow shaft, producing a radio frequency signal within the hollow shaft, modulating the radio frequency signal with the torque signal within the hollow shaft, conducting the modulated signal to a rotating antenna mounted on the hollow shaft, broadcasting the modulated signal from the rotating antenna, receiving the modulated signal on a stationary antenna, directing the modulated signal to a stationary receiver, recovering the torque strain signal from the modulated signal in the receiver and providing an output from the receiver which is proportional to the sensed torque strain inside the hollow shaft.

2. The method of claim 1, wherein the providing power comprises mounting batteries within the hollow shaft.

3. The method of claim 1, wherein the sensing torque strain comprises mounting a four arm strain gauge bridge inside the hollow shaft, providing power from the power supply to opposite positions on the bridge and providing torque output from spaced positions on the strain gauge bridge.

4. The method of claim 3, further comprising providing a shunt between an input and output on the strain gauge bridge.

5. The method of claim 3, further comprising modulating a lower frequency signal with strain gauge bridge output and modulating a higher frequency signal with the modulated lower frequency signal.

6. The method of claim 1, wherein conducting the modulated signal to a rotating antenna mounted on the hollow shaft comprises conducting the modulated radio frequency signal from the transmitter inside the hollow shaft through a cable and leading the cable from the interior of the hollow shaft through a universal joint to the rotating antenna on the outside of the hollow shaft.

7. The apparatus for hollow shaft torque telemetry comprising a power supply for mounting in a hollow shaft, a torque strain gauge connected to the power supply for mounting within the hollow shaft, a transmitter mounted within the hollow shaft and connected to the strain gage and to the power supply for producing a radio frequency signal with strain gauge output modulation, a signal conductor connected to the transmitter and extending through one end of the hollow shaft to outside of the hollow shaft, a rotating antenna mounted outside of the hollow shaft and connected to the signal conductor, a stationary antenna mounted on a vehicle for receiving a radio frequency signal from the rotating antenna, a receiver connected to the stationary antenna for receiving the radio frequency signal and separating strain gauge modulation therefrom and producing an output related to hollow shaft torque.

8. The apparatus of claim 7, wherein the power supply comprises batteries mounted within the hollow shaft.

9. The apparatus of claim 7, wherein the strain gauge comprises a four arm strain gauge bridge having opposite terminals connected to the power supply and having spaced terminals connected to the transmitter.

10. The apparatus of claim 9, further comprising a resistor and shunt calibration function connected between a power supply input to the four arm strain gauge and output of the strain gauge.

11. The apparatus of claim 7, wherein the transmitter is mounted inside the hollow shaft and comprises a radio frequency generator connected to the conduit and a modulator connected to the radio frequency generator and to the strain gauge for modulating the radio frequency according to output of the strain gauge.

12. The apparatus of claim 11, wherein the signal conductor leads from the transmitter through the hollow shaft, out of an end of the hollow shaft, through a universal joint on the end of the hollow shaft and on the outside of the hollow shaft to the rotating antenna.

13. A hollow shaft torque telemetering kit for a race car comprising a strain gauge for mounting inside a hollow shaft on an interior surface, a transmitter for mounting inside the hollow shaft, a power supply for mounting inside the hollow shaft and for connecting to the strain gauge and transmitter, a rotary antenna for mounting on an outside of the hollow shaft and a signal conductor for connecting to the transmitter for extending through an open end of the hollow shaft and through a universal joint at the end of the hollow shaft and connecting to the rotary antenna.

14. The torque telemetering kit of claim 13 fully comprising a stationary receiver for mounting on the race car and a stationary antenna for mounting on the race car and connecting to the stationary receiver, and a power input in the receiver and output on the receiver for providing an output proportional to torque on the hollow shaft.

15. The apparatus of claim 14, wherein the receiver has a band pass filter connected to the antenna and a RF amplifier connected to the band pass filter for amplifying a radio frequency signal from the antenna, a local oscillator for producing a radio frequency signal, a mixer connected to the local oscillator and to the RF amplifier for producing an intermediate frequency signal, an IF amplifier connected to the mixer, a demodulator connected to the IF amplifier, and a low pass filter connected to the demodulator and having gain and zero adjust, wherein the power input comprises a vehicle power input and further comprising a DC regulator connected to the vehicle power input for producing multiple voltage output.

16. The kit of claim 15, wherein the power supply comprises batteries mounted within the hollow shaft.

17. The kit of claim 15, wherein the strain gauge comprises a four arm strain gauge bridge having opposite terminals connected to the power supply and having spaced terminals connected to the transmitter.

18. The kit of claim 17, further comprising a resistor and shunt calibration function connected between a power supply input to the four arm strain gauge and output of the strain gauge.

19. The kit of claim 15, wherein the transmitter is mounted inside the hollow shaft and comprises a radio frequency generator connected to the conduit and a modulator connected to the radio frequency generator and to the strain gauge for modulating the radio frequency according to output of the strain gauge.

20. A torque measurement and telemetry system for race cars comprising a hollow torque transmitting shaft having a universal joint at one end and a wheel mounted at the other end for transmitting drive torque from the universal joint through the shaft to the drive wheel, a strain gauge mounted inside the hollow shaft, a transmitter mounted inside the hollow shaft and connected to the strain gauge, a power supply mounted inside the hollow shaft and connected to the transmitter, an output connected to the transmitter and the power supply, an antenna mounted on an exterior of the hollow shaft.

21. A method of sensing and telemetering torque on a hollow shaft comprising mounting a four arm strain gauge bridge inside a hollow shaft providing power from a power supply within the hollow shaft to opposite positions on the bridge, providing a shunt between input and output on the strain gauge bridge, providing torque output from spaced positions on the strain gauge bridge, producing a torque signal proportional to sensed torque strain within the hollow shaft, producing a radio frequency signal within the hollow shaft, modulating the radio frequency signal with the torque signal within the hollow shaft, conducting the modulated signal to a rotating antenna mounted on the hollow shaft, broadcasting the modulated signal from the rotating antenna, receiving the modulated signal on a stationary antenna, directing the modulated signal to a stationary receiver, recovering the torque strain signal from the modulated signal in the receiver and providing an output from the receiver which is proportional to the sensed torque strain inside the hollow shaft.

22. The method of claim 21, further comprising modulating a lower frequency signal with strain gauge bridge output and modulating a higher frequency signal with the modulated lower frequency signal.

23. The apparatus for hollow shaft torque telemetry comprising a power supply for mounting in a hollow shaft, a four arm strain gauge bridge having opposite terminals connected to the power supply for mounting within the hollow shaft, a transmitter mounted within the hollow shaft and connected to spaced terminals on the strain gauge bridge and to the power supply for producing a radio frequency signal with strain gauge output modulation, a signal conductor connected to the transmitter and extending through one end of the hollow shaft to outside of the hollow shaft, a rotating antenna mounted outside of the hollow shaft and connected to the signal conductor, a stationary antenna mounted on a vehicle for receiving a radio frequency signal from the rotating antenna, a receiver connected to the stationary antenna for receiving the radio frequency signal and separating strain gauge modulation therefrom and producing an output related to hollow shaft torque.

24. The apparatus of claim 23, further comprising a resistor and shunt calibration function connected between a power supply input to the four arm strain gauge and output of the strain gauge.

25. The apparatus of claim 23, wherein the transmitter is mounted inside the hollow shaft and comprises a radio frequency generator connected to the conduit and a modulator connected to the radio frequency generator and to the strain gauge for modulating the radio frequency according to output of the strain gauge.

26. The apparatus of claim 25, wherein the signal conductor leads from the transmitter through the hollow shaft, out of an end of the hollow shaft, through a universal joint on the end of the hollow shaft and on the outside of the hollow shaft to the rotating antenna.

* * * * *